Nov. 19, 1963
W. P. KISTLER
3,111,036
INVERTED PENDULUM ACCELEROMETER
Filed Oct. 24, 1958
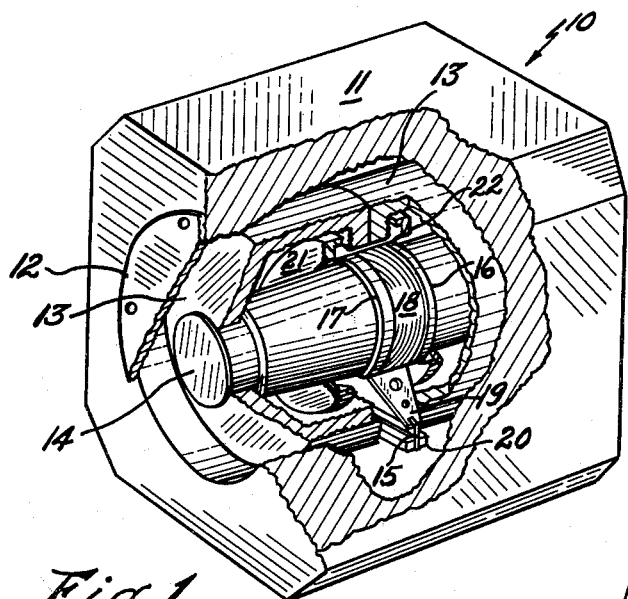
Fig. 1
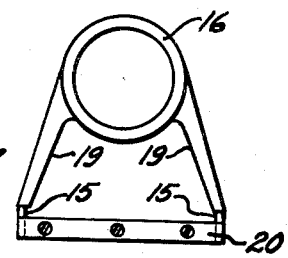
Fig. 3
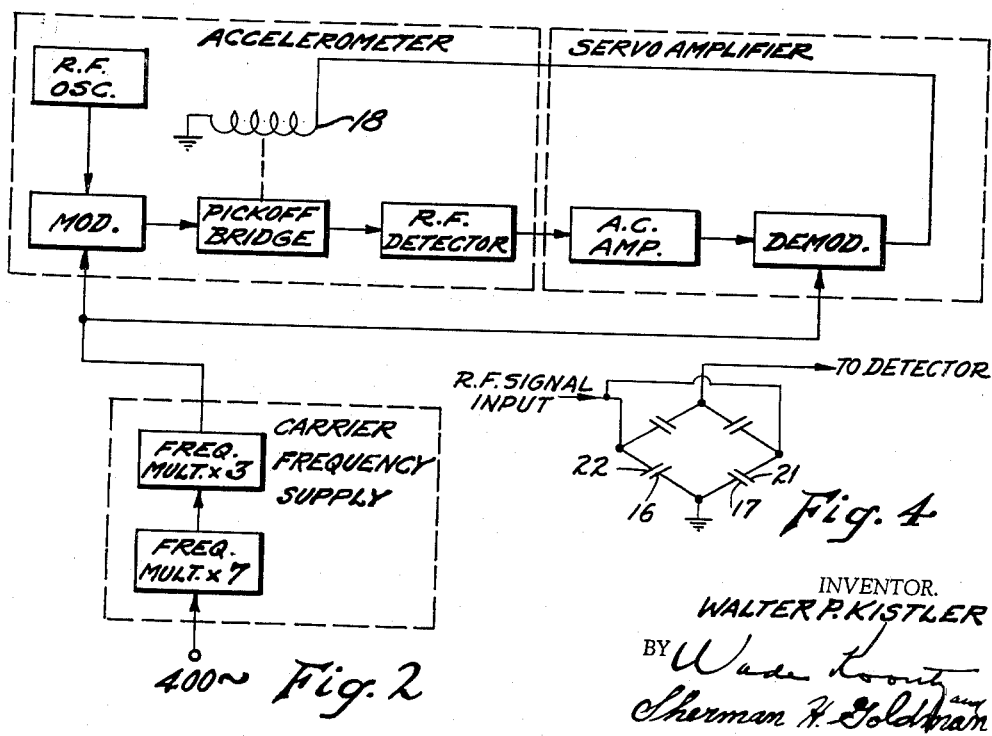
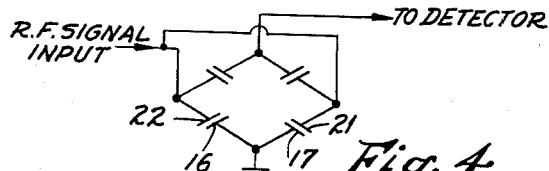
Fig. 4
Fig. 2
INVENTOR.
WALTER P. KISTLER
BY
ATTORNEYS United States Patent Office 3,111,036
Patented Nov. 19, 1963

3,111,036
INVERTED PENDULUM ACCELEROMETER
Walter P. Kistler, Kenmore, N.Y., assignor to the United States of America as represented by the Secretary of the Air Force
Filed Oct. 24, 1958, Ser. No. 769,518
1 Claim. (Cl. 73—517)

This invention relates generally to accelerometer—and more particularly to an accelerometer having an inverted pendulum which is pivoted on two cantilever springs and suspended within the field of a permanent magnet system.

Inertial guidance or navigation systems require measurements of accelerations with extremely high accuracy; however, the present state of the accelerometer art involves the use of jewel or ball bearings which introduce errors because of the friction involved and because a displacement of the axis of rotation is possible.

Accomplishment of the degree of accuracy reuired in inertial guidance systems may be achieved by utilization of the accelerometer disclosed herein. The accelerometer is a null-type instrument in which the torque due to the acceleration of an unbalanced mass is nulled by an electromagnetic torque. Any displacement of the unbalanced mass is measured by a capacitive pick-off which generates a signal for a servo-amplifier, the output of which supplies current to provide an electromagnetic torque to balance out the acceleration torque. Since the electromagnetic torque is proportional to the current flowing through the torque coil, the current is directly proportional to the acceleration of the unbalanced mass.

It is, therefore, an object of this invention to produce a novel accelerometer which eliminates the use of friction producing bearings.

It is another object of this invention to produce a novel accelerometer which eliminates error caused by a displacement of the axis of rotation.

It is still another object of this invention to produce a novel method and means for measuring acceleration which achieves a high degree of reliability and accuracy.

It is a further object of this invention to produce a novel suspension system for an inverted pendulum.

Another object of this invention involves the production of a novel accelerometer and servo-system suitable for use in inertial guidance and navigation systems.

A still further object of this invention involves the production of an accelerometer wherein the measuring point for deflection of a pendulum and the application of restoring torque are at the same point.

Another object of this invention involves the production of a novel accelerometer which utilizes currently available components that lend themselves to a standard mass production manufacturing techniques.

These and other advantages, features and objects of the invention will become more apparent from the following description taken in connection with the illustrative embodiments in the accompanying drawings, wherein:

FIGURE 1 is a pictorial view of the mechanical aspects of the accelerometer;

FIGURE 2 is a block diagram of a servo-system used with the embodiment of FIGURE 1;

FIGURE 3 is a view along a transverse plane intersecting the assembly of FIGURE 1, and showing the pendulum components; and FIGURE 4 is a schematic representation of the capacitor pick-off elements in a standard bridge circuit.

Referring to the drawings the means for measuring acceleration comprises a pendulum unit of the accelerometer (FIGURES 1 and 3) and a servo-system (FIGURE 2).

The pendulum unit of FIGURES 1 and 3 has a housing unit 10 comprising a body 11 and at least one end plate 12.

Within housing 10 is mounted a pair of soft iron shields 13, each of which contains an Alnico magnet 14 which are arranged relative to each other to cause a magnetic field in the air gap therebetween. Suspended within the field of the magnets 14 is an inverted pendulum which is pivotally supported on a pair of thin cantilever springs 15. The pendulum comprises a pair of ring shaped capacitor plates 16 and 17 and a forcer or torquer coil 18 supported between said plates. The plates 16 and 17 have soldered thereto a pair of support legs 19 to which cantilever springs 15 are secured. A base plate 20 is provided for securing the free ends of springs 15 and the orientation of base plate 20 with respect to body 11 provides for alignment of the pendulum in the field of the circular air gap of the two magnets and the surrounding shield. Attachment of the springs 15 to base plate 20 may be made, as indicated in FIGURE 3, by clamping the spring 15 to plate 20 in order that any stresses in the springs may be relaxed. The spring torque due to the legs in this type of mounting is negligible compared to the torque due to acceleration.

The servo-system used with the pendulum unit of FIGURES 1 and 3 is disclosed in the block diagram of FIGURE 2 and is divided into three basic parts; the electronics associated with the accelerometer pendulum unit, a servo-amplifier, and a carrier frequency supply. In order to keep the unbalanced mass displacement under acceleration to a minimum because of cross-coupling effects, a high gain servo is required which, in turn, necessitates a system with a wide bandwith, thus a high frequency carrier supply is necessary.

The suppressed carrier type system of this invention is explained relative to an 8400 cycle carrier frequency, although the invention is not limited thereto. Referring to FIGURE 2, a 400 cycle supply frequency is multiplied by clipping the 400 cycles and passing this waveform through a tuned circuit to obtain 2800 cycles. The 2800 cycle signal is clipped and passed through a bandpass filter tuned to 8400 cycles. Frequency multiplication was chosen for the convenience of utilizing 400 cycles supply and because the beat frequencies between harmonics of the 400 cycle supply and the accelerometer servo-carrier do not cause any problem. The output from the two multiplication stages may be power amplified for presentation of the carrier voltages to the accelerometer servo loop.

The accelerometer assembly contains a pick-off, described above, and means for converting the unbalanced mass position into an electrical signal. The position pick-off comprises a pair of capacitors 16, 22 and 17, 21 wherein the plates 16, 17 are connected together. The pick-off is used in a capacitance bridge as shown in FIGURE 4 in which the pick-off forms two legs of the bridge. Because of the low capacity of the bridge arms, direct application of the carrier frequency directly to the pick-off bridge introduces problems; therefore, an R.F. signal from an R.F. oscillator is amplitude modulated by the carrier frequency and applied to the pick-off bridge. In the bridge the carrier frequency modulated R.F. becomes modulated by the pick-off information. Application of the resultant signal to an R.F. detector for removal of the R.F. leaves an output of the carrier frequency with the pick-off information impressed upon it.

The servo-amplifier receives the output of the R.F. detector and converts it into a direct current signal for the electromagnetic torquer. The A.C. amplifier comprises three stages of voltage gain and a power stage whose output is applied to a phase sensitive power demodulator which supplies the current to the torque coil 18.

Thus, it can be seen that a pendulum containing pick-off elements and a power coil is suspended within a circular air gap with a very strong field. Two fixed rings 21 and 22, insulated from the remainder of the device form plates of capacitors which are arranged in a bridge circuit and are fed with a modulated high frequency voltage. Any motion of the pendulum will change the capacity of the fixed plates to ground and unbalance the bridge thus generating a signal. Since the coil and pick-off are coaxial, the deflection of the pendulum is measured at the same point where the force from the coil is applied and the torque due to the acceleration is nulled by the electromagnetic torque resulting from the servo. Since the electromagnetic torque is proportional to the current flowing through the torque coil, the current is directly proportional to the acceleration of the unbalanced mass, thereby forming an extremely accurate means for measuring acceleration.

Although this invention has been described with reference to a particular embodiment, it will be understood to those skilled in the art that the invention is capable of a variety of alternative embodiments. For example, a frequency other than 8400 cycles may be used in the servo, or the soft iron shield 13 may be of one piece.

I intend to be limited only by the spirit and scope of the appended claim.

I claim:

An acceleration measuring device comprising a pendulum, said pendulum comprising a single torquer coil and a capacitor plate secured to each end of and insulated from said torquer coil;

magnetic field establishing means having a circular air gap for providing a magnetic field around said pendulum;

means for resiliently mounting said pendulum within said gap containing said magnetic field, said means comprising a support fixed relative to said circular air gap, and a pair of cantilever springs each of which is connected with said support at one end and with said capacitor plates at its other end, each of said connections with said capacitor plates being spaced from one another;

a capacitor plate proximate to each of said aforementioned capacitor plates, said capacitor plates secured to said coil being electrically connected, all of said capacitor plates forming a portion of a capacitance bridge wherein said capacitor plates form a pick off;

means for feeding a modulated high frequency voltage to said capacitance bridge such that acceleration caused motion of said pendulum unbalances said bridge to cause a signal to be developed;

and means for detecting said developed signal and converting it to a D.C. signal for application to said torquer coil to null any torque caused by acceleration.

References Cited in the file of this patent

UNITED STATES PATENTS

| | | |
|---|---|---|
| 2,343,063 | Kent | Feb. 29, 1944 |
| 2,359,245 | Ritzmann | Sept. 26, 1944 |
| 2,371,040 | Fisher et al. | Mar. 6, 1945 |
| 2,606,310 | Baker | Aug. 5, 1952 |
| 2,697,594 | Stanton | Dec. 21, 1954 |
| 2,797,912 | Trostler | July 2, 1957 |
| 2,814,768 | Kinkel | Nov. 26, 1957 |
| 2,822,161 | Tikanen | Feb. 4, 1958 |
| 2,869,851 | Sedgfield et al. | Jan. 20, 1959 |
| 2,888,256 | Sedgfield | May 26, 1959 |
| 2,899,190 | Driver | Aug. 11, 1959 |
| 2,942,456 | Hardway | June 28, 1960 |

FOREIGN PATENTS

| | | |
|---|---|---|
| 791,827 | Great Britain | Mar. 12, 1958 |